United States Patent Office 3,365,493
Patented Jan. 23, 1968

3,365,493
MANUFACTURE OF MONOCHLOROACETIC ACID
Denzel D. De Line, Forest B. Wortman, and Andrew A. Holzschuh, Midland, Mich., assignors to The Dow Chemical Company, Midland, Mich., a corporation of Delaware
No Drawing. Filed Sept. 29, 1964, Ser. No. 400,201
4 Claims. (Cl. 260—539)

ABSTRACT OF THE DISCLOSURE

Monochloroacetic acid is crystallized in the form of large free-flowing crystals having higher bulk density by crystallization at −20 to 40° C. from an inert solvent containing (1) less than 1% by weight of acetic acid and (2) about 0.01 to 0.5% of water.

This invention relates to an improved process for the production of monochloroacetic acid. More particularly, the present invention relates to the manufacture of monochloroacetic acid having an improved crystal shape.

The general chemical method of preparing monochloroacetic acid by chlorinating glacial acetic acid is well known. Various refinements of this basic method have been developed and particular methods for the production of monochloroacetic acid are described, for example, in U.S. Patent 2,539,238 to Eaker and U.S. Patent 2,503,334 to Hammond et al. However, crystals of monochloroacetic acid obtained from the chlorinated reaction mixtures of the prior art are invariably small, needle-like crystals. Such crystals tend to conglomerate and consequently are difficult to handle in large quantities such as are encountered in commercial shipments. In addition, the shape and size of these crystals favors the occlusion of undesirable amounts of impurities.

It has now been found that the size and shape of monochloroacetic acid crystals obtained from a mixture of monochloroacetic acid and dichloroacetic acid can be improved to provide a more free-flowing crystalline mass (which resists caking and which contains smaller amounts of occluded impurities) by reducing or eliminating the acetic acid content of the mother liquor during crystallization. It has also been found that the incorporation of a minor amount of water in the mother liquor aids in the formation of crystals of the desired size and shape.

Although not restricted thereto, the process of the invention is especially useful for the crystallization of monochloroacetic acid from a reaction mixture obtained by chlorinating a mixture of glacial acetic acid and acetic anhydride, since the chlorinated reaction product thus obtained always contains relatively large amounts of dichloroacetic acid. Heretofore, it was not possible to obtain free-flowing monochloroacetic acid crystals of uniform size from such a chlorinated reaction mixture.

The chlorinated reaction mixtures suitable for treatment according to this invention may contain (after addition of water) from 0 to 3.0 percent acetic acid, from 0.01 to 0.5 percent water, from 90.0 to 99.0 percent monochloroacetic acid, and from 0 to 5.0 percent dichloroacetic acid (all percentages by weight). The preferred chlorinated reaction products contain from 0 to 1.0 percent acetic acid, from 0.01 to 0.4 percent water, from 94 to 98 percent monochloroacetic acid and from 0.0 to 4.8 percent dichloroacetic acid (all percentages based upon the total weight).

In a specific embodiment of the present invention, a mixture of monochloroacetic acid containing less than about 0.3 percent by weight of acetic acid (based upon the total weight of the acetic acid, dichloroacetic and monochloroacetic acid) is treated with an amount of water sufficient to give about a 0.01 percent to 0.5 percent (preferably about 0.01 to 0.4 percent) by weight (based upon the total weight of the mixture) concentration of free water in the resulting mixture. This mixture is then diluted with a suitable inert solvent to form a feed mixture from which monochloroacetic acid is crystallized. The crystallization of monochloroacetic acid from this mixture results in a superior crystalline monochloroacetic acid product which contains less than about 0.5 percent (usually less than 0.2 percent) by weight of dichloroacetic acid impurity.

By preparing a mixture containing a minor amount of free water and substantially free of acetic acid prior to the crystallization step, final crystals of monochloroacetic acid are obtained in which the ratio of the length to the width of each crystal is low (crystals with length:width ratios of from 5.5:1 to 1.6:1 and with thickness:width ratios of from about 0.9:1 to 0.3:1 may be obtained). Unless the amounts of acetic acid and water are in the indicated ranges, the ratio of the growth rate of the crystals to the nucleation rate during the crystallization of the monochloroacetic acid is such that the crystals do not grow to the proper size or in the proper directions along the desired faces. The result is that the crystals formed from such an environment are predominantly needle-like and do not have the desired properties. The acetic acid content can be reduced by over-chlorinating (i.e. using greater than a stoichiometric amount of chlorine) the acetic acid, even though this procedure produces undesirable dichloroacetic acid. This is possible because the dichloroacetic acid does not interfere with the crystallization of the monochloroacetic acid in the presence of minor amounts of water. One of the main advantages of the process is that the crystals of monochloroacetic can be prepared in the presence of relatively large concentrations of dichloroacetic acid. The weight ratio of dichloroacetic acid to monochloroacetic acid may be as high as about 2:1 (and preferably, no more than about 2:3) without adversely affecting crystal growth in the process of the invention.

In a preferred embodiment of the process of the invention, a mixture of glacial acetic acid and acetic anhydride is chlorinated until no more than about 0.3 percent by weight of acetic acid (based upon the total weight of the reaction mixture) remains in the mixture (determined after hydrolysis at a suitable sample). The reaction mixture is then hydrolyzed with at least a stoichiometric amount of water. Sufficient excess water is added to give about 0.01 percent to 0.4 percent of free water in the resulting mixture. This product is then added to an appropriate inert, non-reactive, solvent such as 1,1,1-trichloroethane, dichloroacetic acid, trichloroethylene, carbon tetrachloride, tetrachloroethylene, mixtures of solvents such as 3:1 (weight) mixtures of $CCl_4$ and carbon disulfide and 3:1 (weight) mixtures of $CCl_4$ and benzene or similar liquids. Other appropriate combinations of such solvents may also be used. Amounts of solvent of up to about five times the weight of the crude chlorinated reaction mixture (including the added water) may be used. Methylene chloride is a preferred solvent for the crystallization step. An "Oslo" type evaporative crystallizer is suitable. Such a crystallizer is described, for example, in British Patent 934,014, the teachings of which are herein incorporated by reference. The crystallization may be carried out with known crystallization apparatus. A preferred method of crystallization involves the preparation of a supersaturated solution by evaporation (although contact cooling methods may also be used). This evaporation method produces a fluidized crystal suspension of monochloroacetic acid crystals with a classification in size ranging from the larger crystals suspended at the bottom to the smaller crystals at the top of the suspension. Crystal growth is allowed to continue in the suspension and the larger crystals at the bottom of the suspension are periodically (or continuously) removed and dried. This method works quite satisfactorily when the acetic acid content of the mother liquor has been reduced to less than about .8–1.0 percent (based on the total weight of the mother liquor under equilibrium conditions during crystallization). The presence of dichloroacetic acid is not detrimental to the process. On the contrary, by reducing the amount of acetic acid in the reaction mixture, the monochloroacetic acid crystals obtained are very low in dichloroacetic acid content (less than about 0.25 percent based upon the total weight of the crystallized material) even though the amount of dichloroacetic acid originally present is greater than is obtained by conventional chlorination of acetic acid. The crystallization may be carried out continuously or batchwise. Fine crystals may be redissolved and the super-saturated solution so produced added to the suspension of growing crystals.

During crystallization, the temperature of the crystal suspension in the growth chamber (or zone) should be from about −20° C. to 40° C. Under equilibrium conditions, the mother liquor in contact with the growing crystals may contain from 20 to 97 percent of solvent (such as methylene chloride), from 0.01 to 0.5 percent water, from 2 to 50 percent monochloroacetic acid, up to 32.5 percent of dichloroacetic acid, and no more than 1.0 percent acetic acid (all percentages based upon the total weight of mother liquor surrounding the growing crystals). The suspension zone in which the crystals are grown may contain up to about 45 to 50 percent by weight of monochloroacetic acid crystals as suspended solids. In a continuous growth process, additional feed is added and proportional amounts of crystals and other components are removed in order to maintain the equilibrium conditions in the growth zone. Exceptionally good results have been obtained using a crystallization temperature of from about 10 to 18° C. with a mother liquor composed of from about 0.01 to 0.4 percent water, from 58 to 80 percent methylene chloride, from 25 to 30 percent dissolved monochloroacetic acid, from 11 to 16 percent dichloroacetic acid, and no more than about 0.3 percent acetic acid (all percents based upon the total weight of the mother liquor). The nominal residence time in the growth zone for the growth of a single crystal is about ten hours. The growth rates for an average crystal in the direction of the length, width, and thickness axes are approximately: $1.92 \times 10^{-4}$, $.782 \times 10^{-4}$, and $.425 \times 10^{-4}$ inches per minute, respectively.

Crystals of monochloroacetic acid manufactured according to the process of the present invention have an average weight of from about 3 to 25 milligrams per crystal. The lengths, widths, and thicknesses of the crystals are measured along mutually perpendicular axes. For crystals in the weight range of from 3 to 25 milligrams, the average ratio of the length of the crystal to its width is from 3.5:1 to 1.6:1, and the average ratio of the thickness of the crystal to the width is from .35:1 to .9:1. The desired crystals are not clustered, have blunt ends and do not contain overgrowths of other crystals. Crystals of monochloroacetic acid produced according to the process of the invention are of substantially uniform size, quality, and purity.

The following examples are submitted for the purpose of illustration only and are not to be construed as limiting the scope of the invention in any way.

*Examples I–IV*

An "Oslo" type crystallizer was charged with 740 pounds of mother liquor from a previous crystallization run. The mother liquor had the following composition:

| Component: | Percent (weight) |
|---|---|
| Methylene chloride+0.28% $H_2O$ | 65.5 |
| Monochloroacetic acid (MCA) | 27.0 |
| Dichloroacetic acid (DCA) | 7.4 |
| Acetic acid (AA) | 0.09 |
| (Total) | 99.99 |

A feed solution was prepared using methylene chloride and crude chlorinated acetic acid of the following composition:

| Component: | Percent (weight) |
|---|---|
| MCA+.1% $H_2O$ | 96.2 |
| DCA | 3.5 |
| AA | 0.3 |
| (Total) | 100.0 |

Three parts by weight of this crude chloroacetic acid was dissolved in 7 parts by weight of methylene chloride.

The mother liquor was circulated at a rate of 32 gallons per minute through the crystallization (suspension) chamber, and slowly cooled to 18° C. The volume of the chamber was approximately 37 gallons. The circulation rate was reduced to 24 gallons per minute and the circulating mother liquor was seeded and a crystallization bed was established with 80 pounds of monochloroacetic acid (also obtained from a previous crystallization run). The temperature of the feed solution was adjusted to from 30 to 34° C. and the feed solution of crude monochloroacetic acid in methylene chloride was started at a rate of 20 pounds of feed solution per hour. The temperature of the feed solution was held above the nucleation temperature to prevent the formation of crystals in the feed line. After feeding the crystallizer for two hours at 20 pounds of feed per hour, crystals of monochloroacetic acid were removed from the crystallization (suspension) chamber at a rate of 6 to 8 pounds per hour. Solution was constantly evaporated and to make up for the volume of monochloroacetic acid crystals removed a fresh solution of feed (or condensate from the evaporation) was periodically added to the system to keep the crystallization chamber completely full at all times.

The monochloroacetic acid crystals which were removed were centrifuged, but it was not necessary to wash these crystals. The properties of the crystals and the process conditions maintained during their formation are summarized in Table I. The data of Table I were obtained from a 12 day continuous crystallization run. Samples of crystals were removed periodically and representative samples were measured and analyzed.

TABLE I

| Example | I | II | III | IV |
|---|---|---|---|---|
| Feed: | | | | |
| Rate (lb./hr.) | 20 | 25 | 25 | 24 |
| Percent (wt.) $CH_2Cl_2$ | 69.6 | 69.7 | 68.4 | 73.6 |
| Percent (wt.) Acid (MCA+DCA+AA) | 30.4 | 30.3 | 31.6 | 26.4 |
| Temperature when added to Crystallizer (° C.) | 32 | 32 | 32 | 33 |
| Crystallizer Suspension Chamber Conditions: | | | | |
| Temperature (° C.) | 17.2 | 17.0 | 17.0 | 16.9 |
| Circulation Rate (gallons per minute) | 29.6 | 36.4 | 38 | 38 |
| Supersaturation (grams of monochloroacetic acid)/liter of solution | 0.39 | 0.40 | 0.40 | 0.33 |
| Average Crystallization Rate (lbs. MCA/hour) | 7.4 | 8.7 | 7.3 | 7.7 |
| Mother Liquor Composition: | | | | |
| Specific gravity | 1.374 | 1.379 | 1.378 | 1.378 |
| Percent (wt.) $CH_2Cl_2$ | 63.3 | 62.4 | 60.4 | 58.2 |
| Percent (wt.) MCA | 28.2 | 28.5 | 30.4 | 29.8 |
| Percent (wt.) DCA | 8.0 | 8.5 | 8.6 | 11.1 |
| Percent (wt.) AA | 0.2 | 0.3 | 0.4 | 0.5 |
| Percent (wt.) $H_2O$ | 0.25 | 0.2 | 0.3 | 0.4 |

Crystals from this 12 day run were periodically removed and the length:width and thickness:width ratios determined for representative samples. The results are summarized in Table II.

TABLE II

| Sample No. | Length:Width | Thickness:Width |
|---|---|---|
| 1 | 3.19 | 0.595 |
| 2 | 3.95 | 0.75 |
| 3 | 3.64 | 0.68 |
| 4 | 3.54 | 0.55 |
| 5 | 4.0 | 0.50 |
| 6 | 4.78 | 0.64 |
| 7 | 2.45 | 0.69 |
| 8 | 3.25 | 0.52 |
| 9 | 2.33 | 0.45 |
| 10 | 2.35 | 0.47 |
| 11 | 2.22 | 0.43 |
| 12 | 1.79 | 0.44 |
| 13 | 2.26 | 0.50 |
| 14 | 2.45 | 0.54 |
| 15 | 2.0 | 0.39 |
| 16 | 2.47 | 0.44 |
| 17 | 2.05 | 0.54 |
| 18 | 5.48 | 0.46 |
| 19 | 3.58 | 0.47 |
| 20 | 3.62 | 0.46 |
| 21 | 3.70 | 0.58 |

We claim as our invention:

1. A method of crystallizing monochloroacetic acid from a reaction mixture obtained by chlorinating glacial acetic acid which comprises:
   (a) reducing the amount of acetic acid in said reaction mixture to below about 1.0 percent by weight (based upon the total weight of acetic acid and monochloroacetic acid in the mixture),
   (b) adding sufficient water to said reaction mixture to provide from about 0.01 to 0.5 percent by weight of free water (based upon the total weight of the reaction mixture),
   (c) diluting the mixture (b) with an amount of inert solvent equal to up to about five times the weight of (b), and
   (d) crystallizing the monochloroacetic acid from the diluted mixture of (c) at a temperature of from $-20°$ to $40°$ C.

2. The process of claim 1 wherein the inert solvent is methylene chloride.

3. The process of claim 1 wherein crystals with a weight of from 3 to 25 milligrams having a length to width ratio of from 3.5:1 to 1.6:1 and a thickness to width ratio of from 0.45:1 to 0.9:1 are continuously removed during the crystallization step (d).

4. The method of claim 1 wherein the crystallization of the monochloroacetic acid is effected by
   (1) supersaturating the solution produced in step (c) by partial evaporation of the solvent,
   (2) feeding the supersaturated solution into a suspension of crystalline monochloroacetic acid in saturated mother liquor so as to classify the suspended crystals by size,
   (3) removing those crystals having the desired size,
   (4) recycling a major portion of the mother liquor from step 3 to step 1, and
   (5) removing a minor portion of the mother liquor sufficient to hold the concentration of dichloroacetic acid at the desired level.

References Cited

UNITED STATES PATENTS

| 2,503,334 | 4/1950 | Hammond et al. | 260—539 |
| 2,539,238 | 1/1951 | Eaker | 260—539 |
| 2,790,828 | 4/1957 | Haimsohn | 260—539 |
| 2,809,214 | 10/1957 | Haimsohn | 260—539 |

FOREIGN PATENTS

| 934,014 | 8/1963 | Great Britain. |
| 949,393 | 2/1964 | Great Britain. |

LORRAINE A. WEINBERGER, *Primary Examiner.*

A. P. HALLUIN, *Assistant Examiner.*